United States Patent
Beck

(10) Patent No.: US 11,863,019 B2
(45) Date of Patent: Jan. 2, 2024

(54) ROTOR LAMINATION, ROTOR LAMINATED CORE, ROTOR, ELECTRIC MACHINE, AND VEHICLE

(71) Applicant: VALEO SIEMENS EAUTOMOTIVE GERMANY GMBH, Erlangen (DE)

(72) Inventor: Christine Beck, Oberleichtersbach (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 423 days.

(21) Appl. No.: 17/096,057

(22) Filed: Nov. 12, 2020

(65) Prior Publication Data

US 2021/0159745 A1 May 27, 2021

(30) Foreign Application Priority Data

Nov. 27, 2019 (DE) ...................... 10 2019 132 188.3

(51) Int. Cl.
*H02K 1/276* (2022.01)
*B60L 50/60* (2019.01)
*B60L 50/10* (2019.01)

(52) U.S. Cl.
CPC .............. *H02K 1/276* (2013.01); *B60L 50/10* (2019.02); *B60L 50/60* (2019.02)

(58) Field of Classification Search
CPC .. H02K 1/276; H02K 2213/03; H02K 1/2766; H02K 1/274; B60L 50/10; B60L 50/60; Y02T 10/70
See application file for complete search history.

(56) References Cited

U.S. PATENT DOCUMENTS

| 10,003,227 B2 | 6/2018 | Jurkovic et al. | |
| 2015/0162790 A1* | 6/2015 | Isoda | H02K 1/2766 |
| | | | 310/156.47 |
| 2018/0358852 A1* | 12/2018 | Roopnarine | H02K 1/2766 |
| 2019/0238014 A1* | 8/2019 | Kol | H02K 1/2766 |

FOREIGN PATENT DOCUMENTS

| DE | 102013219260 A1 * | 4/2014 | ........... H02K 1/2766 |
| DE | 102016105078 A1 | 9/2016 | |
| EP | 3352337 A1 | 7/2018 | |

* cited by examiner

*Primary Examiner* — Tulsidas C Patel
*Assistant Examiner* — Joshua Kiel M Rodriguez
(74) *Attorney, Agent, or Firm* — Manabu Kanesaka

(57) ABSTRACT

A rotor lamination is subdivided into a plurality of equidistant sectors of equal size, each including a first half-sector and a second half-sector separated from the first half-sector by a separation plane. A through-opening is formed in the first half-sector and has a first leg side, of which the imaginary extension intersects the separation plane below a radially outwardly open acute angle, a second leg side, which runs parallel to the first leg side and of which the imaginary extension intersects the separation plane radially further outwards than the imaginary extension of the first leg side, and an edge connecting ends of the leg sides furthest away from the separation plane. A further through opening formed mirror-symmetrically to the first through-opening with respect to the separation plane is formed in the second half-sector, wherein the edge has an equidistant portion equidistant to an outer contour of the rotor lamination.

12 Claims, 5 Drawing Sheets

ROTOR LAMINATION, ROTOR LAMINATED CORE, ROTOR, ELECTRIC MACHINE, AND VEHICLE

RELATED APPLICATIONS

Figure 1:
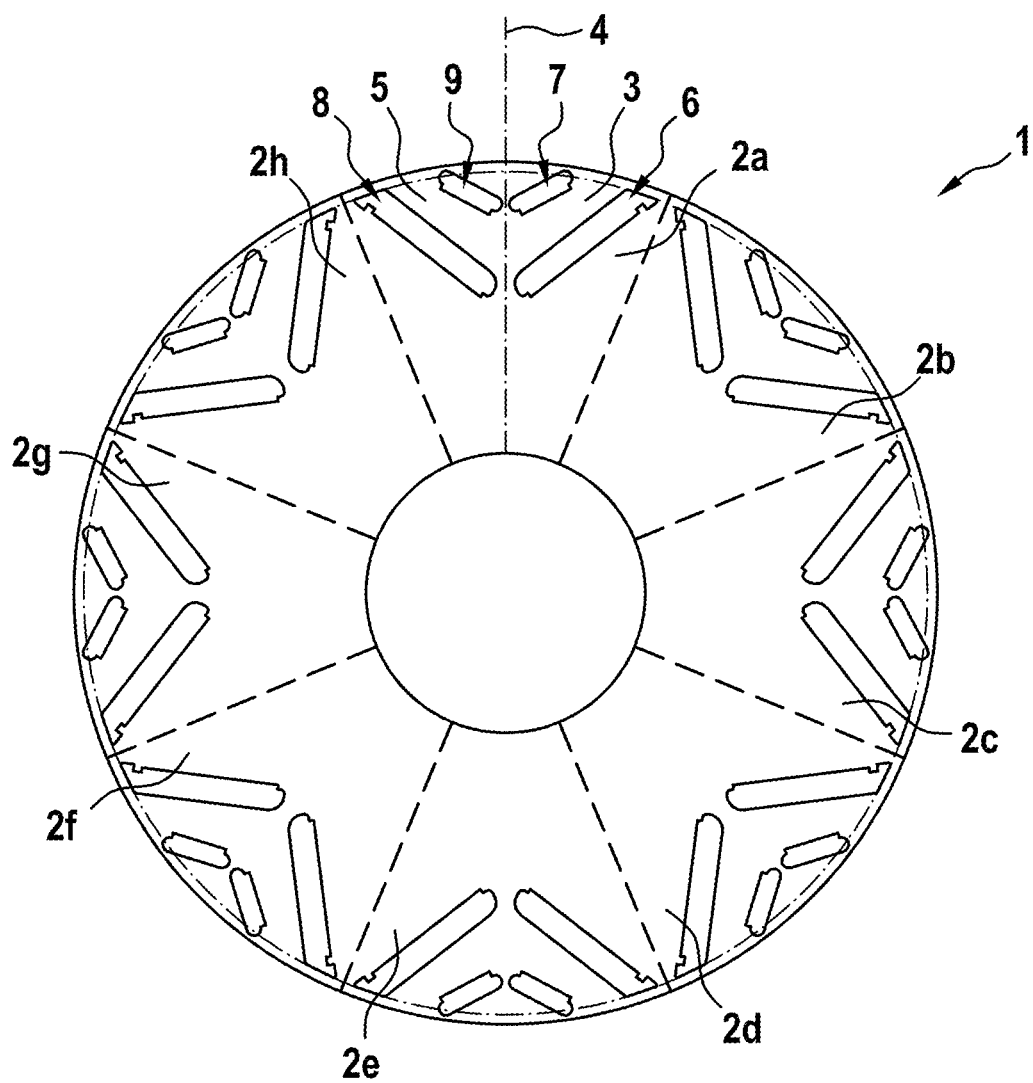

The present application is based on, and claims priority from, German Application No. DE 10 2019 132 188.3 filed Nov. 27, 2019, the disclosure of which is hereby incorporated by reference herein in its entirety.

The present invention relates to a rotor lamination which is subdivided into a plurality of equidistant sectors of equal size each comprising a first half-sector and a second half-sector separated from the first half-sector by a plane of separation, wherein a through-opening is formed in the first half-sector and has a first leg side, of which the imaginary extension intersects the plane of separation at a radially outwardly open acute angle, a second leg side, which runs parallel to the first leg side and of which the imaginary extension intersects the separation plane radially further outwards than the imaginary extension of the first leg side, and an edge connecting ends of the leg sides which face away from the separation plane, wherein a further through-opening, which is formed mirror-symmetrically to the first through-opening with respect to the separation plane, is formed in the second half-sector.

The invention also relates to a rotor laminated core, a rotor, an electric machine, and a vehicle.

Such a rotor lamination is known, for example, from the document EP 3 352 337 A2, which discloses a laminated core formed from rotor laminations. The rotor lamination comprises first and second recesses, which are arranged circumferentially around the rotor lamination. The first and second recesses are used to accommodate permanent magnets and have a slotted, elongate and straight design for this purpose. The first and second recesses are oriented in such a way that their longitudinal extensions run obliquely in relation to a radial direction. Two first and second recesses arranged in a V-shape to each other form a rotor pole in each case.

When operating a rotor formed from such rotor laminations at high speeds, considerable mechanical stresses occur in bridge areas between radially outer ends of the through-openings and an outer contour of the rotor lamination. A mechanical stress resistance of these bridge areas regularly limits the permissible speed of the rotor. In order to increase this, a larger distance to the outer diameter must be provided for a given shape of the through-opening, however, this usually leads to undesirable magnetic leakage fluxes, or a more costly material with higher stress resistance must be used for the rotor laminations.

The object of the invention is therefore to describe an improved design of rotor laminations, in particular for use in an engine for a vehicle.

In order to achieve this object, it is provided in accordance with invention in a rotor lamination of the type mentioned at the outset, that the edge has an equidistant portion which is equidistant to an outer contour of the rotor lamination.

The invention is based on the finding that a significant reduction of mechanical stresses in a bridge area between the edge and the outer contour of the rotor lamination may be achieved if the edge has the equidistant portion. The rotor lamination according to the invention advantageously makes it possible to operate a rotor formed of rotor laminations according to the invention at a higher speed, or, alternatively, at a given speed, to form rotor laminations with a lower flux leakage and/or from a material having a lower mechanical resistance, which reduces the costs of such a rotor lamination.

In the sense of the present invention, the edge is equidistant to the outer contour of the rotor lamination if the edge consists of those points which lie on a normal of a point of the outer contour at a predetermined distance.

Typically, the outer contour of the rotor lamination according to the invention is circular. However, irregularly round outer contours are also conceivable, for example. In particular, the equidistant portion is also concentric with the outer contour. The rotor lamination metal according to the invention preferably has at least four, particularly preferably at least six, very particularly preferably at least eight sectors. The equidistant portion is not punctiform. A chord of the equidistant portion typically has a length of at least 25 percent, preferably at least 50 percent, particularly preferably at least 75 percent, of a distance between the first leg side and the second leg side. Where it is said that the through-openings are mirror-symmetrical, this does not mean that the rotor lamination as a whole is necessarily mirror-symmetrical in both half-sectors.

Preferably, in its transition as viewed from the first leg side to the equidistant portion, the edge has a projection pointing into the through-opening. The projection advantageously forms a lateral limitation or a stop for a permanent magnet to be accommodated in the through-opening and also facilitates the positioning of the permanent magnets during the production of a rotor. A further projection may be adjacent to the end of the first leg side facing the separation plane.

In order to enable an enlargement of the equidistant portion, it is preferable if the edge has a rebate in its transition as viewed from the first leg side into the equidistant portion, which rebate points away from the through-opening.

For certain embodiments, it is provided that the projection is between the first leg side and the rebate.

It may be provided that the edge between the rebate and the equidistant portion has a straight portion, preferably parallel to the imaginary extension of the first leg side.

In a particularly preferred embodiment, the rebate is limited by an imaginary line running parallel to the first leg side and intersecting the plane of separation radially further inwards than the imaginary extension of the first leg side. It may be provided here that the distance between an imaginary line running parallel to the first leg side and up to which the projection extends into the through-opening is at least 1.1 times, preferably at least 1.2 times, particularly preferably at least 1.3 times, and/or at most 2 times, preferably at most 1.7 times, particularly preferably at most 1.4 times, the distance between the imaginary line up to which the rebate extends and the imaginary extension of the first leg side.

According to an alternative embodiment, which also allows a basic enlargement of the equidistant portion, it is provided that the rebate will not extend further than the imaginary extension of the first leg side.

As an alternative to the rebate described above, it may be provided that the edge between the projection and the equidistant portion runs straight, preferably parallel to the imaginary extension of the first leg side. This allows easy production of the rotor lamination, especially in view of the complexity of the punching tools used.

Lower point mechanical stresses may be achieved by transitioning the edge into the equidistant portion, rounded off with a smaller radius of curvature than that of the equidistant portion.

In the case of the rotor lamination according to the invention, it may also be provided that the edge transitions from the second leg side into the equidistant portion by a rounding, the radius of curvature of which is smaller than that of the equidistant portion. In this way, it is also possible to avoid or reduce excess point stresses at the transition from the second leg side to the equidistant portion.

In order to form an improved air-gap magnetic field, it is further preferred that a second through-opening is formed in the first half-sector, wherein the second through-opening has a first leg side, of which the imaginary extension intersects the plane of separation at a radially outwardly open acute angle radially further outwards than the imaginary extension of the second leg side of the first through-opening, and a second leg side, which runs parallel to the first leg side and of which the imaginary extension intersects the separation plane further radially outwards than the imaginary extension of the first leg side, wherein a further through-opening is formed in the second half-sector and is mirror-symmetrical to the second through-opening with respect to the separation plane. Such an arrangement of is also referred to as a double-V arrangement.

It is also conceivable that in the first half-sector there is a further through-opening that is perpendicular to the separation plane. Such an arrangement is also referred to as a triangular or delta arrangement.

The object of the invention is also achieved by a rotor laminated core comprising a plurality of rotor laminations according to the invention, which are connected to each other in layers in such a way that through-openings of the rotor laminations form a magnetic pocket extending in the axial direction.

The object of the invention is further solved by a rotor comprising a rotor laminated core according to the invention, one or more permanent magnets being arranged in each case in a magnet pocket.

In addition, the problem underlying the invention is solved by an electric machine comprising a rotor according to the invention.

Lastly, the object of the invention is solved by a vehicle comprising an electric machine, which is designed to drive the vehicle.

Figure 2:
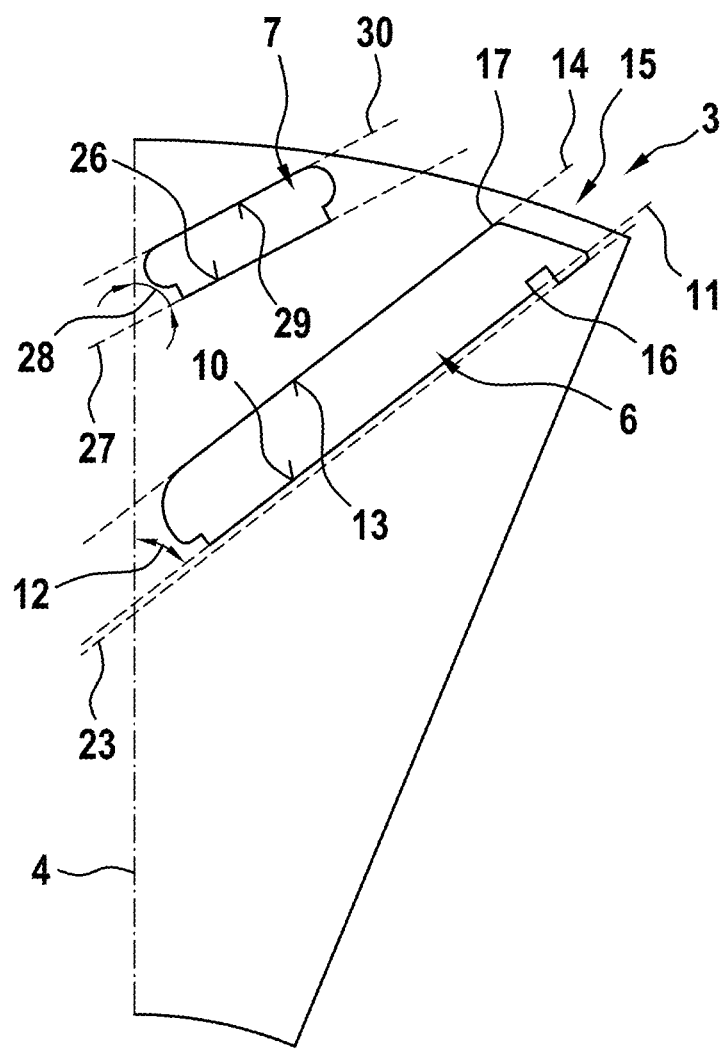
Figure 3:
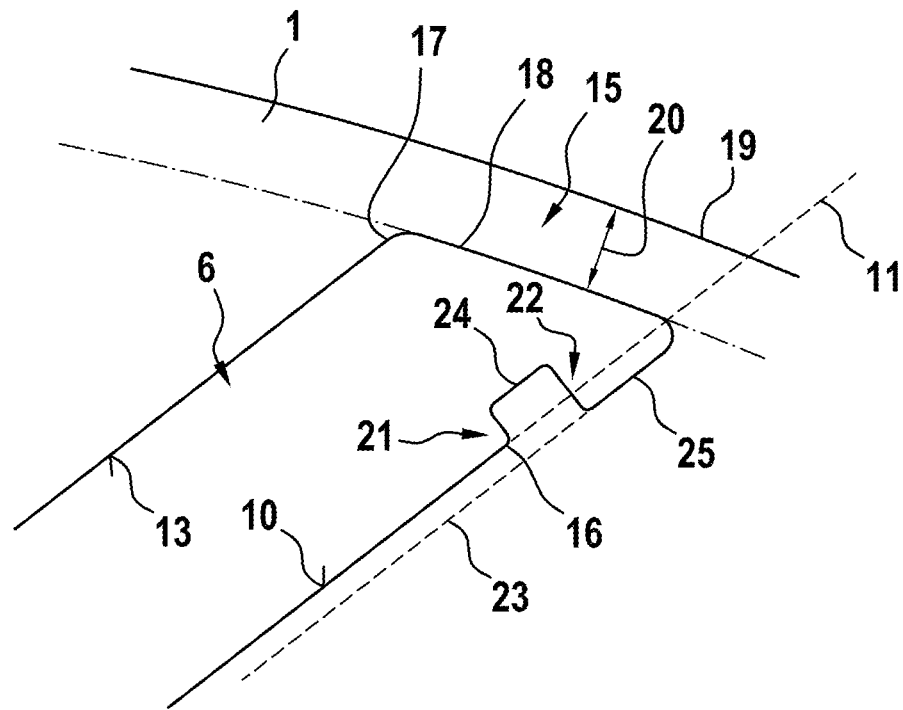
Figure 4:
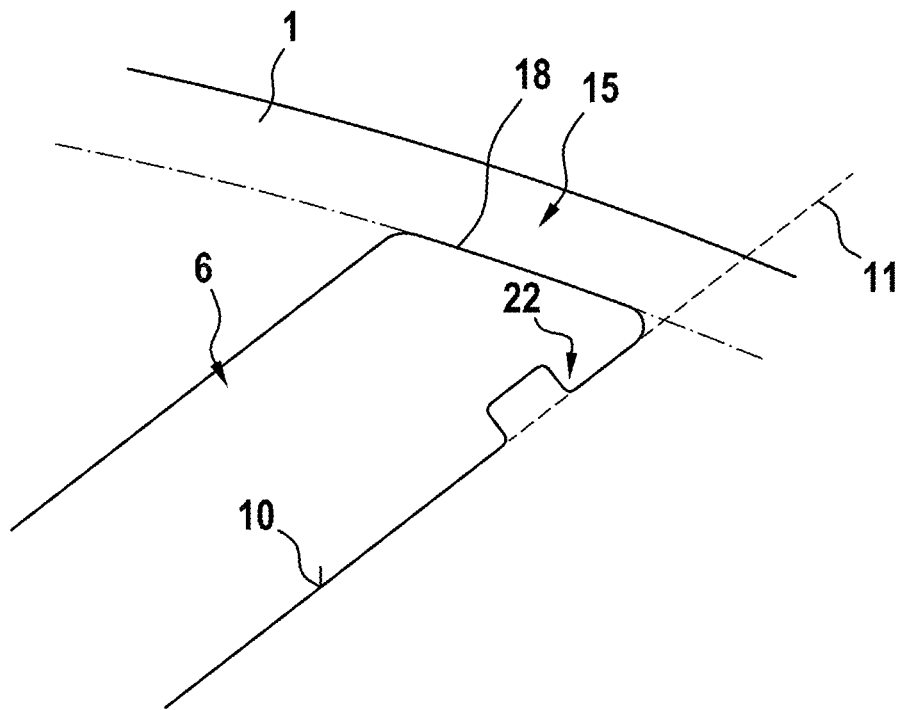
Figure 5:
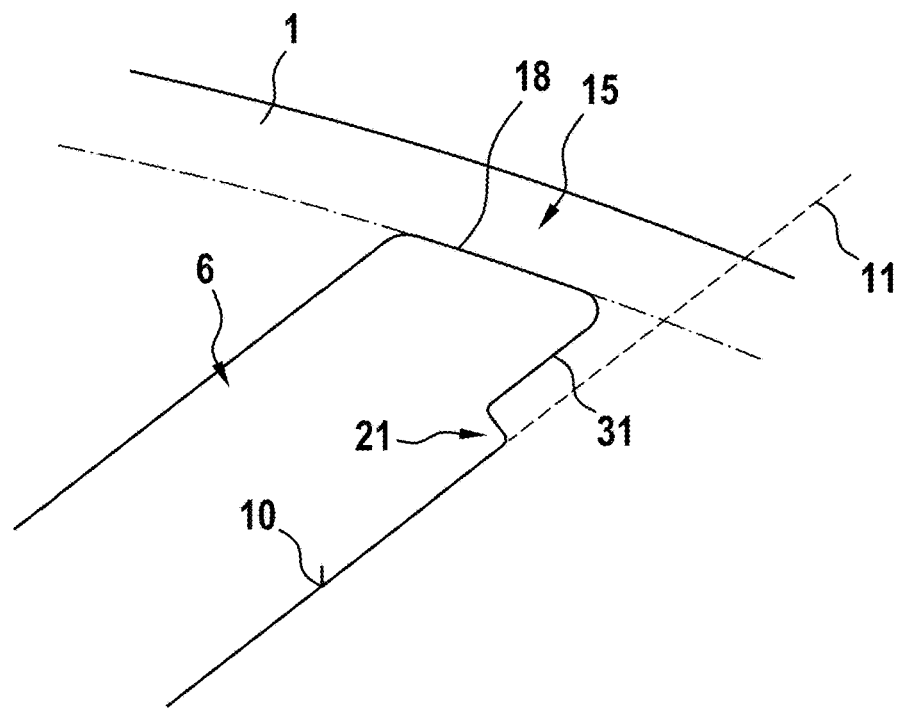
Figure 6:
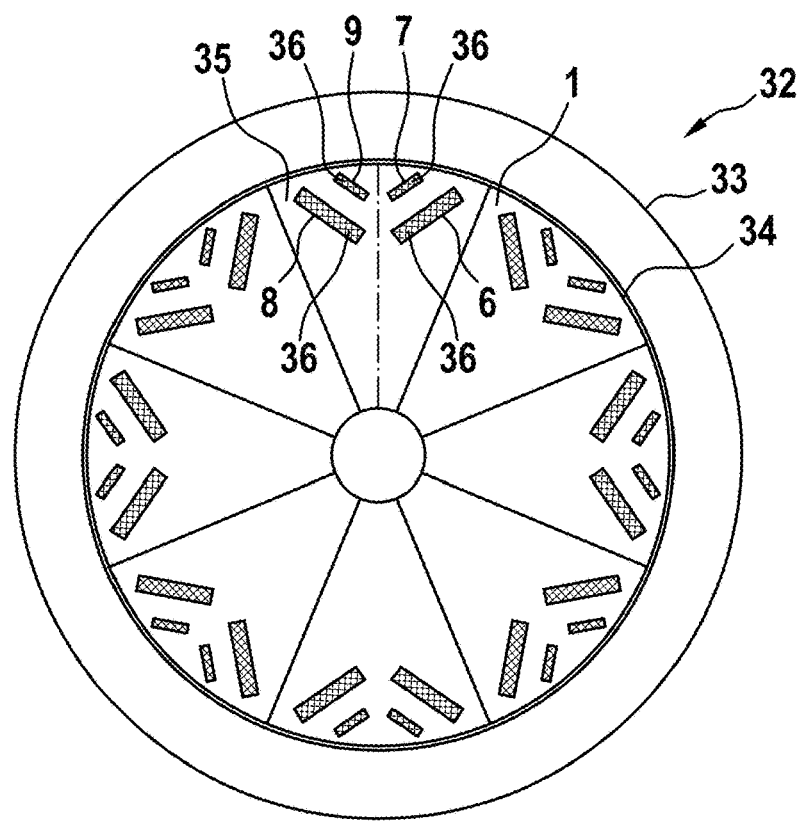
Figure 7:
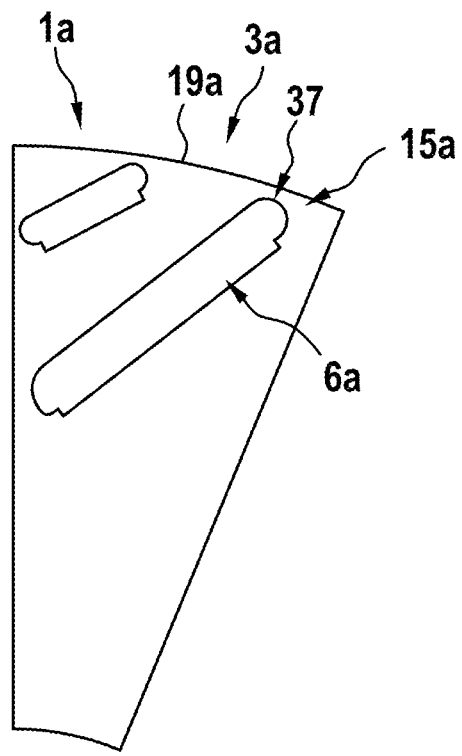
Figure 8:
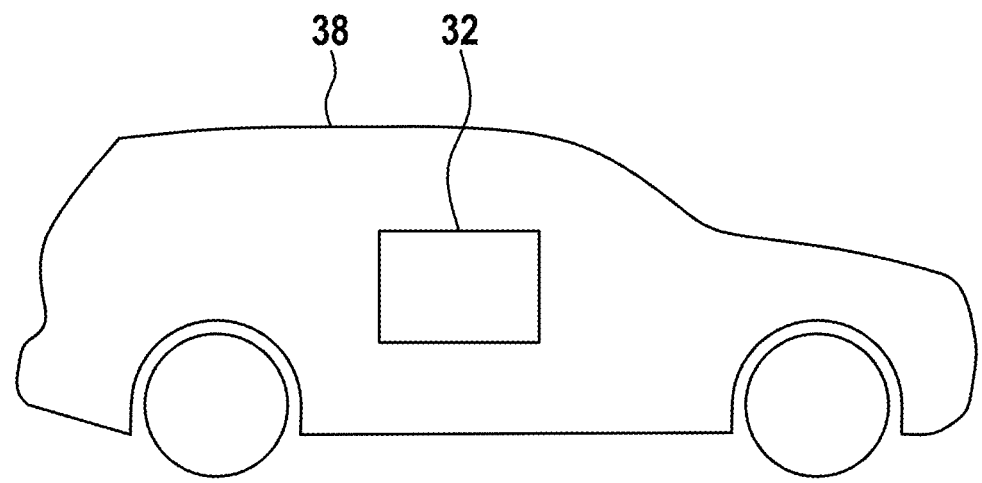

Further advantages and details of the present invention will become clear from the embodiments described in the following, as shown in the drawings. These are schematic representations and show:

FIG. 1 a plan view of a first embodiment of the rotor lamination according to the invention;

FIG. 2 a plan view of a half-sector of the rotor lamination shown in FIG. 1;

FIG. 3 a detailed view of an edge of a through-opening of the rotor lamination shown in FIG. 1;

FIG. 4 a detailed view of an edge of a through-opening of a second embodiment of the rotor lamination according to the invention;

FIG. 5 detailed view of an edge of a through-opening of a third embodiment of the rotor lamination according to the invention;

FIG. 6 a basic sketch of an embodiment of an electric machine according to the invention, comprising a embodiment of a rotor according to the invention with a rotor laminated core according to the invention;

FIG. 7 a plan view of a half-sector of a rotor lamination according to the prior art; and FIG. 8 a basic sketch of an embodiment of the vehicle according to the invention.

FIG. 1 is a plan view of a first embodiment of a rotor lamination 1, which is subdivided into a plurality of equidistant sectors 2a to 2h of the same size. The number of sectors 2a to 2h in this example is eight.

Each sector 2a to 2h has a first half-sector 3 and a second half-sector 5 separated from the first half-sector 3 by a separation plane 4. The first half-sector 3 has a first through-opening 6 and a second through-opening 7. The second half-sector 5 has a further through-opening 8 formed mirror-symmetrically to the first through-opening 6, and a further through-opening 9 formed mirror symmetrically to the second through-opening 7, in each case with respect to the separation plane 4. Due to the symmetry of the through-openings 6 to 9, only the through-openings 6 and 7 in sector 2a provided in the first half-sector 3 are described below, and are therefore also representative of the half-sectors 3, 5 of other sectors 2b to 2g.

FIG. 2 is a plan view of the first half-sector 3 of sector 2a.

The first through-opening 6 has a first leg side 10, of which the imaginary extension 11 intersects the separation plane 4 at an acute angle 12. A second leg side 13 of the first through-opening 6 runs parallel to the first leg side 10. An imaginary extension 14 of the second leg side 13 intersects the separation plane 4 radially further outwards than the imaginary extension 11 of the first leg side 10. The first through-opening 6 has an edge 15 which connects an end 16 of the first leg side 10 furthest away from the separation plane 4 to an end 17 of the second leg side 13 furthest away from the separation plane 4.

FIG. 3 is a detailed view of the edge 15 of the first through-opening 6.

The edge 15 has an equidistant portion 18, which is equidistant to an outer contour 19 of the rotor lamination 1. A distance 20 between the equidistant portion 18 and the outer contour 19 is therefore constant in the radial direction over a certain angular range in the circumferential direction. A length of a chord of the equidistant portion corresponds substantially to the distance between the leg sides 10, 13.

Furthermore, the edge 15 has a projection 21, pointing into the through-opening 6 in the transition of the edge to the equidistant portion 18 as seen from the first leg side 10, and a rebate 22 between the projection 21 and the equidistant portion 18. The rebate 22 is delimited by an imaginary line 23, which runs parallel to the first leg side 10 and intersects the separation plane 4 (see FIG. 2) radially further inwards than the imaginary extension 11 of the first leg side 10. Between the projection 21 and the rebate 22, the edge 15 has a straight portion 24, which runs parallel to the imaginary extension 11 of the first leg side 10, but may alternatively also be oblique. A distance between the straight portion 24 and the imaginary line 23 is approximately 1.3 times the distance between the straight portion 24 and the imaginary extension 11 of the first leg side 10. Between the rebate 22 and the equidistant portion 18, the edge 15 has another straight portion 25 which extends along the imaginary line 23.

Transitions from the end 16 of the first leg portion to the projection 21, from the projection 21 to the straight portion 24, from the straight portion 24 to the rebate 22, from the rebate 22 to the straight portion 25 and from the straight portion 24 to the equidistant portion 18 are each formed by a rounding of which the radius of curvature is smaller than that of the equidistant portion 18. Such a rounding also forms the transition from the end 17 of the second leg side 13 to the equidistant portion 18.

Again with reference to FIG. 2, the second through-opening 7 has a first leg side 26, of which the imaginary extension 27 intersects the separation plane 4 at a radially outwardly open acute angle 28 radially further outwards than the second leg side 13 of the first through-opening 6. The angle 28 is greater than the angle 12 in the present case. A second leg side 29 of the second through-opening 7 runs parallel to the first leg side 26. An imaginary extension 30 of the second leg side 29 intersects the separation plane 4 radially further outwards than the imaginary extension 27 of the first leg side of the second through-opening 7.

The following second and third embodiment of a rotor lamination 1 differs from the first embodiment according to FIG. 1 to FIG. 3 only in the design of edge 15, and therefore all previous comments with regard to the first embodiment may be transferred to these embodiments, unless otherwise described in the following.

FIG. 4 is a detailed view of the edge 15 of the first through-opening 6 of the second embodiment of the rotor lamination 1. The rebate 22 extends here to the imaginary extension 11 of the first leg side 10. The chord of the equidistant portion 18 is thus somewhat shorter than in the first embodiment.

FIG. 5 is a detailed view of the edge 15 of the first through-opening 6 of the third embodiment of the rotor lamination 1. Here, the edge 15 between the projection 21 and the equidistant portion 18 runs along a straight portion 31, which is parallel to the imaginary extension 11 of the first leg side 10, but may alternatively also be oblique. Transitions from the projection 21 to the straight portion 31 and from the straight portion 31 to the equidistant portion 18 are each formed by a rounding of which the radius of curvature is smaller than that of the equidistant portion 18. The chord of the equidistant portion 18 is slightly shorter than in the second embodiment.

FIG. 6 is a basic sketch of an embodiment of an electric machine 32, comprising a stator 33 and an embodiment of a rotor 34 mounted inside the stator 33.

The rotor 34 comprises an embodiment of a laminated core 35, which is formed from a plurality of layered and laminated rotor laminations 1 according to one of the embodiments described above. The through-openings 6 to 9 of each rotor lamination are arranged congruently one above the other, so that they form magnet pockets of the rotor laminated core 35 for permanent magnets 36 of the rotor 34.

FIG. 7 is a plan view of a half-sector 3a of a rotor lamination 1a according to the prior art, in which an edge 15a of a through-opening 6a clearly does not have an equidistant portion. Apart from this, rotor lamination 1 a corresponds substantially to the first embodiment of the rotor lamination 1.

It was determined by simulation that, during rotating operation at a speed of 16,000 min$^{-1}$ of an electric machine corresponding to FIG. 6, which is constructed on the basis of the rotor lamination 1a, a maximum of mechanical stress of approx. 424 MPa is present in a bridge area 37 between the edge 15a and an outer contour 19a of the rotor lamination 1a. By contrast, the maximum mechanical stress in such a bridge area is approx. 410 MPa in the third embodiment, approx. 370 MPa in the second embodiment, and approx. 337 MPa in the first embodiment, so that reductions of the maximum mechanical stress of 3.3 percent, 12.7 percent and 20.5 percent respectively may be achieved by the equidistant portions 18.

FIG. 8 is a basic sketch of an embodiment of a vehicle 38, comprising an embodiment of an electric machine 32 according to FIG. 6 which is designed to drive the vehicle 38. The vehicle 38 may be a battery electric vehicle (BEV) or a hybrid vehicle.

The invention claimed is:

1. A rotor lamination, comprising:
   a plurality of equidistant sectors into which the rotor lamination is equally divided, each of the plurality of equidistant sectors including
      a first half-sector,
      a second half-sector separated from the first half-sector through a separation plane,
      a first through-opening formed in each of the first half-sector and the second half-sector and having
         a first leg side, a first imaginary extension extending on the first leg side and intersecting the separation plane (4) at a first radially outwardly open acute angle,
         a second leg side apart from and parallel to the first leg side, a second imaginary extension extending on the second leg side and intersecting the separation plane radially further outwards than the first imaginary extension of the first leg side, and
         an edge connecting ends of the first and second leg sides furthest away from the separation plane, and having
            an equidistant portion circumferentially extending equidistant from an outer contour of the rotor lamination, and
            a first transition portion extending between the first leg side and the equidistant portion and including
               a projection projecting into the first through opening,
               a first straight portion extending from the projection and parallel to the first imaginary extension, and
               a rebate extending opposite to the projection from the first straight portion,
   wherein the first through opening of the second half-sector is formed mirror-symmetrically to the first through-opening of the first half-sector with respect to the separation plane,
   the rebate extends between the first straight portion and an imaginary line apart from and parallel to the first leg side and intersecting the separation plane radially further inwards than the first imaginary extension of the first leg side, and
   a distance between the imaginary line and one end of the projection projecting into the first through-opening is at least 1.1 times of a distance between the imaginary line and the first imaginary extension of the first leg side.

2. The rotor lamination according to claim 1, wherein the projection is between the first leg side and the first straight portion.

3. The rotor lamination according to claim 1, wherein the edge further includes a second straight portion extending between the rebate and the equidistant portion and parallel to the first imaginary extension of the first leg side.

4. The rotor lamination according to claim 1, wherein the first transition portion is rounded off at a side of the equidistant portion with a radius having a curvature smaller than that of the equidistant portion.

5. The rotor lamination according to claim 1, wherein the edge further includes a second transition portion extending between the equidistant portion and the second leg side and rounded off at a side of the equidistant portion with a radius having a curvature smaller than that of the equidistant portion.

6. The rotor lamination according to claim 1, wherein each of the first and second half-sectors further includes a second through-opening having
- a third leg side, a third imaginary extension extending on the third leg side and intersecting the separation plane at a second radially outwardly open acute angle radially further outwards than the second imaginary extension, and
- a fourth leg side apart from and parallel to the third leg side, a fourth imaginary extension extending on the fourth leg side and intersecting the separation plane radially further outwards than the third imaginary extension of the third leg side,
- wherein the second through-opening of the second half-sector is formed mirror-symmetrically to the second through-opening of the first half-sector with respect to the separation plane.

7. A rotor laminated core comprising:
- a plurality of rotor laminations, each of the plurality of rotor laminations being the rotor lamination according to claim 6, connected to each other in layers such that the first and second through openings of each of the plurality of rotor laminations form a magnetic pocket extending in an axial direction.

8. A rotor comprising:
- the rotor laminated core according to claim 7,
- wherein a permanent magnet is arranged in each magnet pocket.

9. An electric machine comprising:
- the rotor according to claim 8.

10. A vehicle comprising:
- the electric machine according to claim 9, which is designed to drive the vehicle.

11. The rotor lamination according to claim 1, wherein the edge further includes a second straight portion extending between the rebate and the equidistant portion, and
- the imaginary line extends on the second straight portion.

12. The rotor lamination according to claim 11, wherein the rebate has a length longer than that of the projection, and the projection and the rebate extend perpendicular to the first and second straight portions.

* * * * *